(12) United States Patent
Johnson et al.

(10) Patent No.: US 8,867,157 B2
(45) Date of Patent: Oct. 21, 2014

(54) PERPENDICULAR POLE HEAD FOR SERVO WRITING MAGNETIC MEDIA

(71) Applicant: Imation Corp., Oakdale, MN (US)

(72) Inventors: Douglas W. Johnson, Stillwater, MN (US); Larold Olson, Lindstrom, MN (US); Yung Yip, Afton, MN (US); Stephen J. Rothermel, Roseville, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 13/754,078

(22) Filed: Jan. 30, 2013

(65) Prior Publication Data

US 2013/0265672 A1    Oct. 10, 2013

Related U.S. Application Data

(60) Provisional application No. 61/620,199, filed on Apr. 4, 2012.

(51) Int. Cl.
| | |
|---|---|
| *G11B 5/09* | (2006.01) |
| *G11B 5/596* | (2006.01) |
| *G11B 5/008* | (2006.01) |
| *G11B 5/187* | (2006.01) |
| *G11B 5/584* | (2006.01) |

(52) U.S. Cl.
CPC ........ *G11B 5/59638* (2013.01); *G11B 5/00813* (2013.01); *G11B 5/187* (2013.01); *G11B 5/584* (2013.01)
USPC .............. 360/48; 360/46; 360/55; 360/78.02; 360/110

(58) Field of Classification Search
None
See application file for complete search history.

(56) References Cited

U.S. PATENT DOCUMENTS

| | | | |
|---|---|---|---|
| 4,493,779 A | 1/1985 | Kamiyama |
| 4,493,874 A | 1/1985 | Kubo et al. |
| 4,672,009 A | 6/1987 | Takahashi |
| 4,690,768 A | 9/1987 | Kamiyama |
| 4,975,791 A | 12/1990 | Eggebeen |
| 5,132,860 A | 7/1992 | Von Stein |
| 5,247,397 A | 9/1993 | Sato et al. |
| 5,293,285 A | 3/1994 | Leonhardt et al. |

(Continued)

FOREIGN PATENT DOCUMENTS

| | | |
|---|---|---|
| GB | 812 023 A | 4/1959 |
| JP | 1208712 A | 8/1989 |
| JP | 2009-020943 A | 1/2009 |
| SU | 1631598 A1 | 2/1991 |

OTHER PUBLICATIONS

Kryder, Mark H. "An Introduction to Magnetic Recording Heads," in: Hadjipanayis, George C., ed., *Magnetic Storage Systems Beyond 2000*, NATO Science Series, vol. 41, Netherlands, Kluwer Academic Publishers, 2001, pp. 449-466.

(Continued)

*Primary Examiner* — Muhammad N Edun
(74) *Attorney, Agent, or Firm* — Dorsey & Whitney, LLP

(57) ABSTRACT

The present disclosure relates to a perpendicular pole head for creating a perpendicular magnetic moment in a concentrated pattern for writing the pattern on perpendicular magnetic media, such as BaFe based media. The pole head can have flux concentrators in the shape of the written pattern, which can be repeatedly applied to a moving magnetic medium to create a timing pattern on the media, e.g., a servo timing pattern.

19 Claims, 21 Drawing Sheets

(56) References Cited

U.S. PATENT DOCUMENTS

| | | |
|---|---|---|
| 5,572,392 A | 11/1996 | Aboaf et al. |
| 5,689,384 A | 11/1997 | Albrecht et al. |
| 6,021,013 A | 2/2000 | Albrecht et al. |
| 6,040,964 A | 3/2000 | Saliba |
| 6,282,051 B1 | 8/2001 | Albrecht et al. |
| 6,462,904 B1 | 10/2002 | Albrecht et al. |
| 6,542,325 B1 | 4/2003 | Molstad et al. |
| 6,647,613 B2 | 11/2003 | Beck et al. |
| 6,781,778 B1 | 8/2004 | Molstad et al. |
| 6,807,025 B1 | 10/2004 | Benakli et al. |
| 6,822,827 B1 | 11/2004 | Heinz et al. |
| 6,824,817 B2 | 11/2004 | Araki et al. |
| 6,842,305 B2 | 1/2005 | Molstad et al. |
| 6,943,987 B1 | 9/2005 | Raymond et al. |
| 6,950,269 B1 | 9/2005 | Johnson |
| 6,972,931 B2 | 12/2005 | Rudi et al. |
| 7,002,763 B2 | 2/2006 | Bui et al. |
| 7,012,774 B2 | 3/2006 | Nakao et al. |
| 7,038,873 B2 | 5/2006 | Shimazaki et al. |
| 7,050,251 B2 | 5/2006 | Lundstrom |
| 7,054,101 B1 | 5/2006 | Marion et al. |
| 7,072,133 B1 | 7/2006 | Yip et al. |
| 7,132,164 B2 | 11/2006 | Yamazaki et al. |
| 7,180,699 B1 | 2/2007 | Dee |
| 7,190,551 B2 | 3/2007 | Suda |
| 7,193,812 B2 | 3/2007 | Eaton |
| 7,206,167 B2 | 4/2007 | Beck et al. |
| 7,224,544 B2 | 5/2007 | Takano et al. |
| 7,381,482 B2 | 6/2008 | Yamazaki et al. |
| 7,436,622 B2 | 10/2008 | Johnson et al. |
| 7,515,374 B2 | 4/2009 | Nakao |
| 7,551,380 B2 | 6/2009 | Watson et al. |
| 7,623,310 B2 | 11/2009 | Nakao |
| 7,736,769 B2 | 6/2010 | Ajan |
| 7,864,487 B2 | 1/2011 | Cherubini et al. |
| 7,986,485 B2 | 7/2011 | Mckinstry et al. |
| 8,014,100 B2 | 9/2011 | Biskeborn et al. |
| 8,228,637 B2 | 7/2012 | Schaefer et al. |
| 8,254,052 B2 | 8/2012 | Dugas |
| 8,310,780 B2 | 11/2012 | Imaino et al. |
| 8,670,203 B2 | 3/2014 | Ohtsu et al. |
| 2003/0017364 A1 | 1/2003 | Kikitsu et al. |
| 2003/0095353 A1 | 5/2003 | Nakao |
| 2003/0099059 A1 | 5/2003 | Nakao |
| 2004/0080847 A1 | 4/2004 | Lundstrom |
| 2005/0099718 A1 | 5/2005 | Takano et al. |
| 2005/0122620 A1 | 6/2005 | Suda |
| 2005/0254170 A1 | 11/2005 | Dugas et al. |
| 2006/0126207 A1 | 6/2006 | Johnson et al. |
| 2006/0177702 A1 | 8/2006 | Ajan |
| 2007/0223126 A1 | 9/2007 | Olson et al. |
| 2007/0230040 A1 | 10/2007 | Dugas et al. |
| 2007/0231609 A1 | 10/2007 | Ajan et al. |
| 2008/0024905 A1 | 1/2008 | Johnson et al. |
| 2008/0030899 A1 | 2/2008 | Norton |
| 2008/0049356 A1 | 2/2008 | Weber et al. |
| 2008/0158721 A1 | 7/2008 | Bui et al. |
| 2008/0304180 A1 | 12/2008 | Schaefer et al. |
| 2009/0040643 A1* | 2/2009 | Weng et al. ............ 360/55 |
| 2009/0046396 A1 | 2/2009 | Nagata et al. |
| 2009/0080108 A1 | 3/2009 | Watson et al. |
| 2009/0141393 A1 | 6/2009 | Vanderheyden et al. |
| 2010/0002335 A1 | 1/2010 | Dugas |
| 2010/0246057 A1 | 9/2010 | Mckinstry et al. |
| 2011/0102116 A1 | 5/2011 | Biskeborn et al. |
| 2011/0102936 A1* | 5/2011 | Sugiyama et al. ............ 360/75 |
| 2011/0141604 A1 | 6/2011 | Dugas et al. |
| 2011/0222187 A1 | 9/2011 | Biskeborn |
| 2012/0019954 A1 | 1/2012 | Imaino et al. |
| 2012/0050908 A1 | 3/2012 | Ohtsu et al. |
| 2012/0050910 A1 | 3/2012 | Ohtsu et al. |
| 2012/0194941 A1 | 8/2012 | Jubert |
| 2012/0314318 A1 | 12/2012 | Olson et al. |
| 2012/0314319 A1 | 12/2012 | Olson et al. |
| 2012/0314320 A1 | 12/2012 | Olson et al. |
| 2012/0314322 A1 | 12/2012 | Olson et al. |
| 2013/0148235 A1 | 6/2013 | Ochi et al. |
| 2013/0286504 A1 | 10/2013 | Rothermel et al. |

OTHER PUBLICATIONS

Cherubini, Giovanni, et al. "29.5-Gb/in$^2$ Recording Areal Density on Barium Ferrite Tape," *IEEE Transactions on Magnetics*, vol. 47, No. 1, pp. 137-147, Jan. 2011.

International Search Report dated Apr. 25, 2013, for PCT Application No. PCT/US2013/023816 filed Jan. 30, 2013.

International Search Report dated Aug. 13, 2012, for PCT Application No. PCT/US2012/042094 filed Jun. 12, 2012.

U.S. Appl. No. 13/795,668, filed Mar. 12, 2013, entitled "Methods and System for Magnetic Media Servo Writing".

U.S. Appl. No. 13/795,482, filed Mar. 12, 2013, entitled "Tapered Pole Heads for Magnetic Media".

U.S. Appl. No. 13/795,421, filed Mar. 12, 2013, entitled "Systems and Methods for Processing Magnetic Media".

U.S. Appl. No. 13/795,590, filed Mar. 12, 2013, entitled "Servo Write Head".

\* cited by examiner

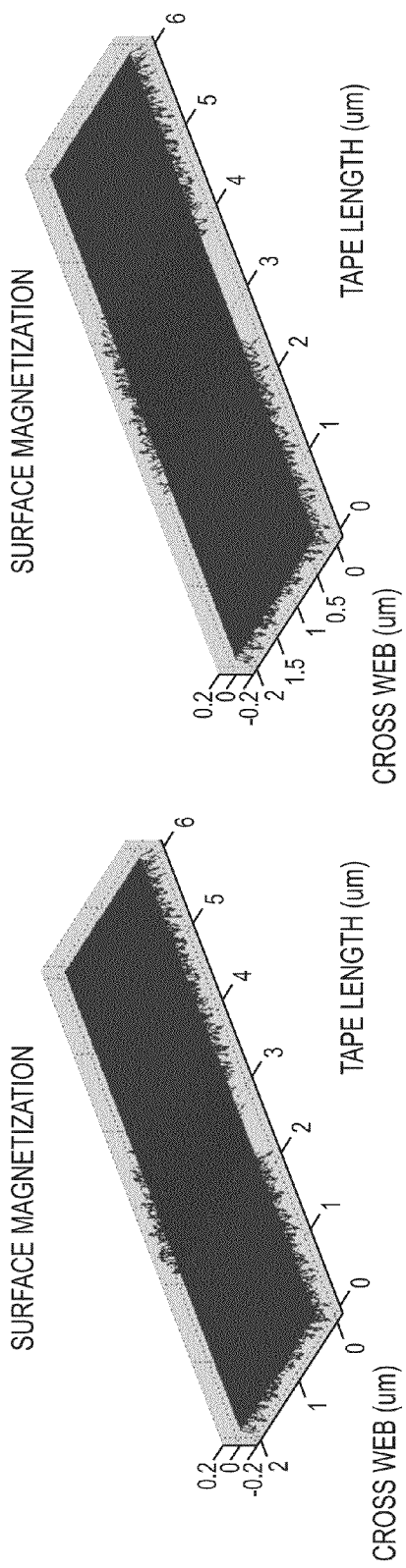
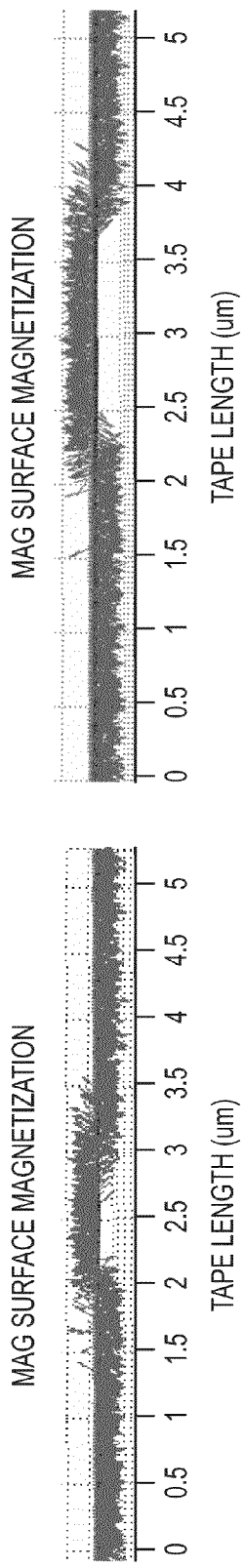
Fig. 3E
Fig. 3F
Fig. 3C
Fig. 3D

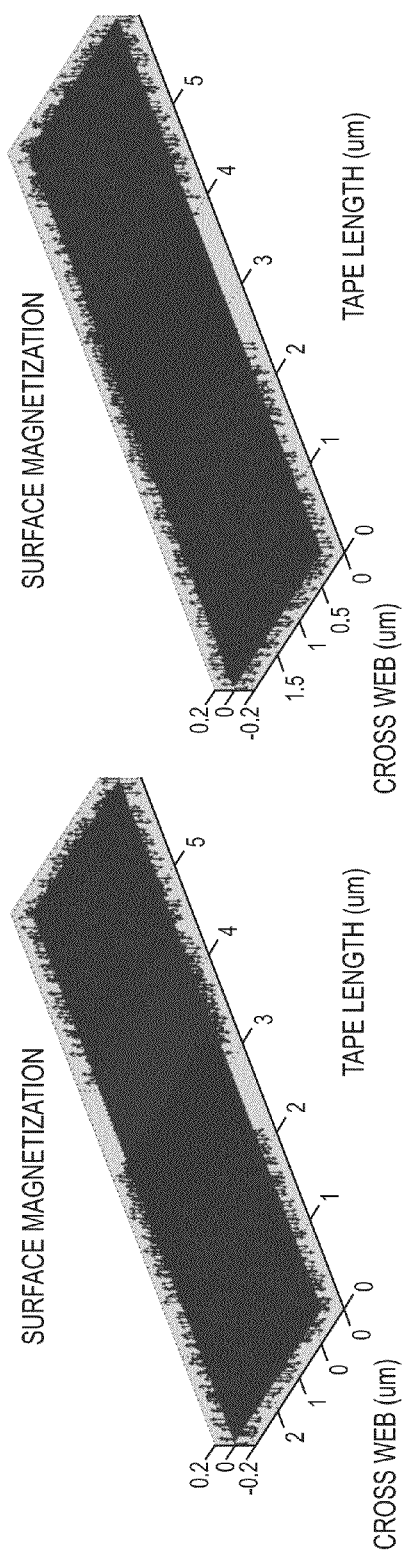
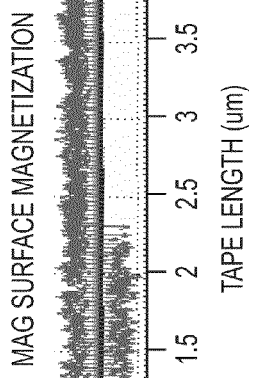
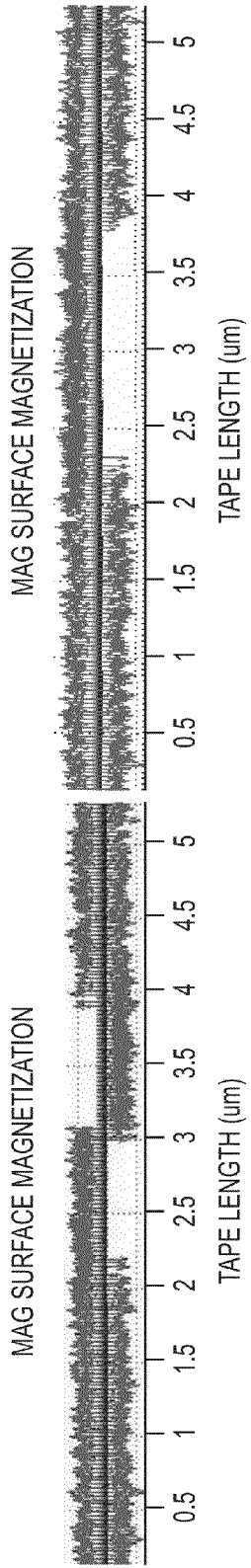
Fig. 3I
Fig. 3G
Fig. 3J
Fig. 3H

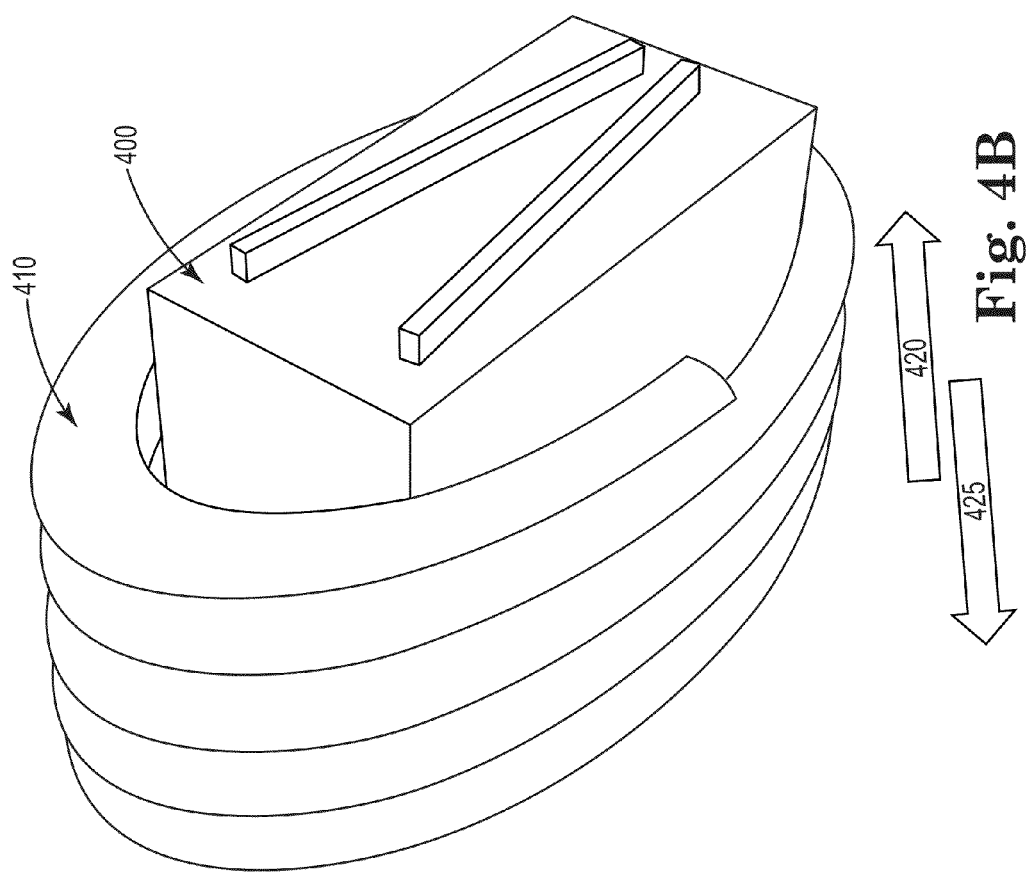

PERPENDICULAR POLE HEAD FOR SERVO WRITING MAGNETIC MEDIA

CROSS-REFERENCE TO RELATED APPLICATIONS

This application claims priority to U.S. Provisional Application No. 61/620,199, filed Apr. 4, 2012, entitled POLE HEAD FOR SERVO WRITING MAGNET, which is hereby incorporated by reference herein, in its entirety.

BACKGROUND OF THE INVENTION

Traditionally, the recording and reading of data in tracks on magnetic storage media can require precise positioning of magnetic read/write heads. To facilitate the precise positioning, magnetic storage media can include a servo track read by a servo control system. U.S. Pat. No. 5,689,384 includes details of background servo timing methods and devices, and is incorporated herein by reference.

Track following servo systems have kept the industry on track to achieve one terabyte ("TB") of storage on a commercial single reel tape cartridge. It appears, however, that modifications may be required to move beyond 1 TB. Longitudinal errors in placement of the servo pattern can generate false position information during drive servo operation. The magnitude of these errors can become unacceptable at the high track densities of multi-terabyte data cartridges.

Time-based servo bands, which are written to tape during the manufacturing process, can be used as a reference to position all data tracks for the life of the cartridge. Time-based servo bands can include a series of repeating patterns (e.g., servo frames) down the length of a tape. In a simplified version of this pattern, each frame can be made up of two magnetic stripes written at an angle with respect to one another (e.g., a "/\" shape). FIG. 1 illustrates two frames 110 in the "/\" shape. The servo pattern can be decoded in a drive by measuring the distance (a) 120 between frame stripes at the servo read gap position while tape is transported longitudinally across the recording head (e.g., in direction 150). A geometric transformation can then yield the vertical position (y) 130 of the read gap 140 with respect to each servo frame on tape.

Servo-writing for magnetic tape can utilize a ring head technology to write longitudinal timing-based servo patterns on tape. This has traditionally been useful for writing metal particle ("MP") media, with a magnetic moment substantially in plane with the media. However, there also exist perpendicular media with the magnetic moment perpendicular to the plane of the tape, or other media surface. Barium-Ferrite ("BaFe") is an example of such a tape medium. BaFe media are described in U.S. Pat. Nos. 7,132,164, 7,381,482, 4,690,768, 4,493,779, and 4,493,874, which are incorporated herein by reference. Perpendicular media can be preferential in some applications, and may provide a greater data density.

Traditional ring head designs can write timing-based servo patterns to magnetic tape. FIG. 2A illustrates one such traditional ring head design, 205. When pulsed with write current (e.g., through coil 210), these traditional heads 205 can generate a magnetic field 200 that is mainly longitudinal between the two poles and vertical (and opposite) very near the poles. When writing media with a planer magnetic moment (e.g., a magnetic moment in the plane of the media), the resulting magnetization of the media can create a useful read-back signal with sharp transitions at the boundaries of the regions magnetically written by the write head, e.g., as illustrated in FIG. 2B. However, such a traditional ring head design does not produce the same results for perpendicular media, such as media 220 illustrated in FIG. 2A.

The magnetization state of oriented media 220 is illustrated in cross-section, and can be driven from left to right (or vice-versa) over ring head 205. Magnetization elements are shown in both a positive and negative orientation in AC erased area 221. Using a ring head 205 on AC erase media creates both a positive 223 and negative 227 magnetization region.

FIG. 2C illustrates a ring head 205 writing to less oriented media 222. The magnetization state of less oriented media 222 is AC erased (e.g., as shown in areas 221) with ring head 205 writing to area 224. As illustrated, the longitudinal nature of ring head field 210 can cause less oriented media 222 (e.g., media that is not completely perpendicular) to have a transition zone 224 between the positive and negative regions that shows a transition with a longitudinal component (e.g., a "leaning" orientation at the transition). The magnetization state of less oriented media 222, with transition area 224, is illustrated in perspective view in FIG. 2D, and again in cross-sectional view in FIG. 2E.

FIG. 2F illustrates a cross-sectional view of the magnetization state of DC erased media 225, with a ring head field 200 applied. As illustrated in DC erased areas 231, the erased media orientation is in a single direction, consistent with a DC current flowing through a coil in one direction. This can be compared to AC erased media, where erased areas (e.g., 221) are oriented in both directions, in approximately equal amounts, consistent with an AC current alternating through coil 210. Here, as compared to FIGS. 2A and 2C, the back half of the ring head field can have the same concentration (e.g., complete) as the erased areas 231. However, as shown in FIG. 2F, there can still be "fuzzy" or "leaning" transition lines in the written area.

Thus, there exists a need for new pole head designs for writing the timing based servo pattern on substantially perpendicular media.

SUMMARY

Certain exemplary embodiments of the present disclosure can include a perpendicular write head. The exemplary write head can include a primary write head configured to generate a magnetic field approximately perpendicular to a surface of the head. The exemplary write head can include a concentrator on the surface configured to concentrate the magnetic field in a pattern. Certain exemplary embodiments can include at least two servo stripes disposed at an angle with respect to each other as part of the concentrator. Exemplary concentrators can be disposed in substantially a "V" or "/\" shape, or a "/\/" shape, a "\/\" shape, or a "//\\" shape. The magnetic field in certain example embodiments can be substantially generated by the primary write head approximately perpendicular to the surface facing the magnetic media (e.g., a media-facing or air-bearing surface), and the primary write head may not generate a substantial magnetic field approximately parallel to the media-facing surface, as compared to the magnitude of the magnetic field approximately perpendicular to the surface. The magnetic field may be concentrated in a medium by the concentrator, so that the concentrated magnetic field is greater than (e.g., about) 110% of a coercivity of the medium, where the magnetic field generated by the primary write head is less than (e.g., about) 90% of the coercivity of the medium, absent the concentrator.

The exemplary primary write head can be configured to generate the magnetic field in a first direction approximately perpendicular to and away from the surface of the head. The exemplary primary write head also can be configured to generate the magnetic field in a direction approximately perpendicular to the surface of the head and in a direction opposite the first direction. The exemplary primary write head also can be configured to generate the magnetic field alternating between the first direction and the second direction.

Certain exemplary embodiments can also include a coil of wire wrapped around the primary write head. Certain exemplary embodiments can also include a cover configured to be disposed substantially on the surface and defining holes through which the concentrator is received such that, when disposed substantially on the surface, an outer (e.g., media-facing) surface of the concentrator is approximately flush with an outer (e.g., media-facing) surface of the cover. The exemplary cover can be formed from a non-magnetic material and/or a magnetically neutral material.

Exemplary embodiments of the present invention can include a storage medium that includes a magnetically perpendicular media including a first set of areas oriented in a first direction perpendicular to the media and a second set of areas oriented in a second direction perpendicular to the media and opposite of the first direction, wherein the first or second areas include a pattern. The exemplary pattern can be a servo timing pattern, and can include a plurality of servo stripes angled with respect to each other.

Exemplary embodiments of the present invention can include a method of writing a magnetic pattern. The exemplary method can include moving a magnetic media relative to a write head, wherein the write head includes: (1) a primary write head configured to generate a magnetic field approximately perpendicular to a surface of the head; and (2) a concentrator on the surface configured to concentrate the magnetic field in a pattern. The exemplary method can include generating the magnetic field during a write time period to create the magnetic pattern that covers less than all of the magnetic media. The generating of the magnetic field can include applying an electric current to the write head in a first direction. The exemplary method can further include generating an opposite magnetic field during a non-write time period or an erase time period that does not include the write time period. This generating an opposite magnetic field can include applying the electric current to the write head in a second direction opposite the first direction. The magnetic pattern may include a plurality of servo strips, each with a length of about 75% to about 125% of an average length of the plurality of servo stripes in the pattern.

Other exemplary embodiments can include non-transitory computer readable storage media having a program embodied thereon, the program executable by a processor to perform a method for writing a magnetic pattern according to any of the other embodiments above, or additional exemplary embodiments.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIGS. 3C and 3D are a perspective view and a cross-sectional view of a ring head writing to DC erased media, respectively;

FIGS. 3E and 3F are a perspective view and a cross-sectional view of a pole head writing to DC erased media, respectively, according to another exemplary embodiment of the present disclosure;

FIGS. 3G and 3H are a perspective view and a cross-sectional view of a ring head writing to AC erased media, respectively;

FIGS. 3I and 3J are a perspective view and a cross-sectional view of a pole head writing to AC erased media, respectively, according to another exemplary embodiment of the present disclosure;

FIG. 4B is an exemplary pole write head with an exemplary wire coil, according to one exemplary embodiment of the present disclosure;

DETAILED DESCRIPTION

Figure 3A:
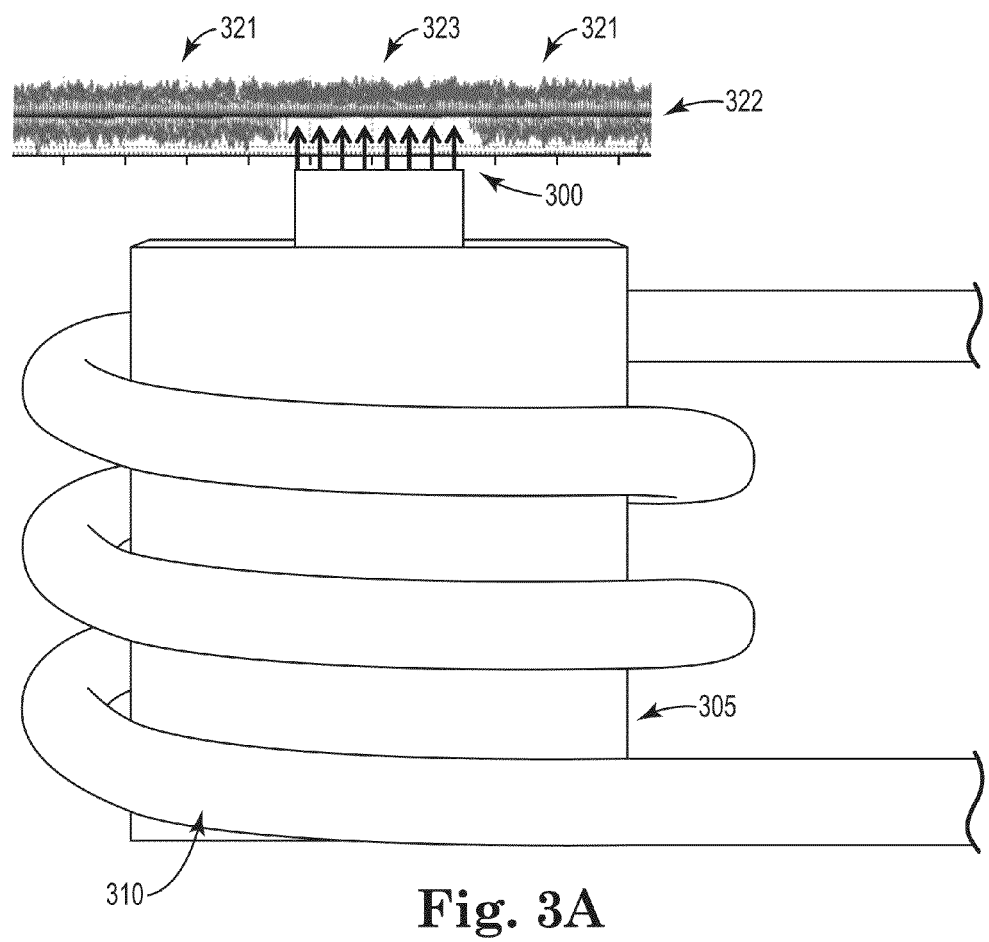
FIG. 3A is an exemplary pole write head, according to one exemplary embodiment of the present disclosure.
Figure 5:
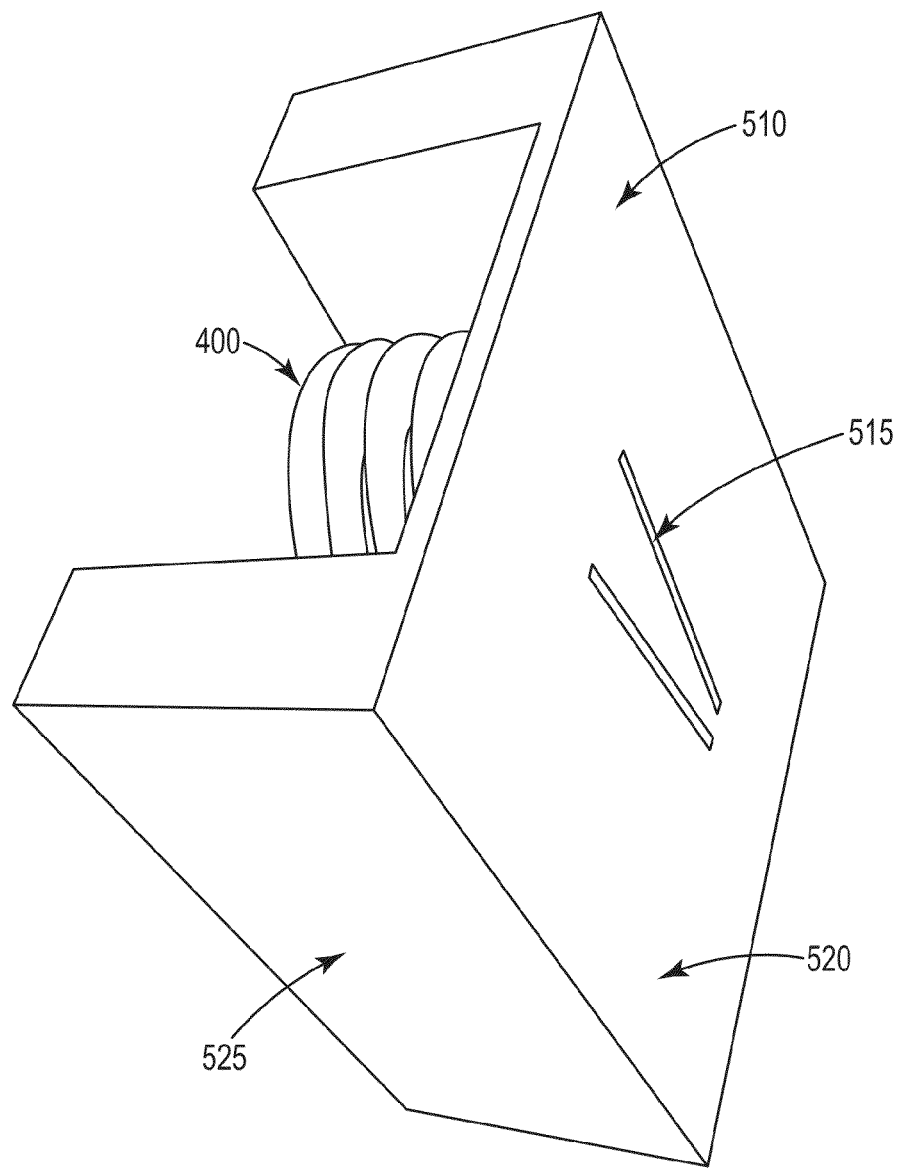
FIG. 5 is an exemplary pole write head with the exemplary wire coil and an exemplary surface cover portion, according to one exemplary embodiment of the present disclosure.
Figure 6A:
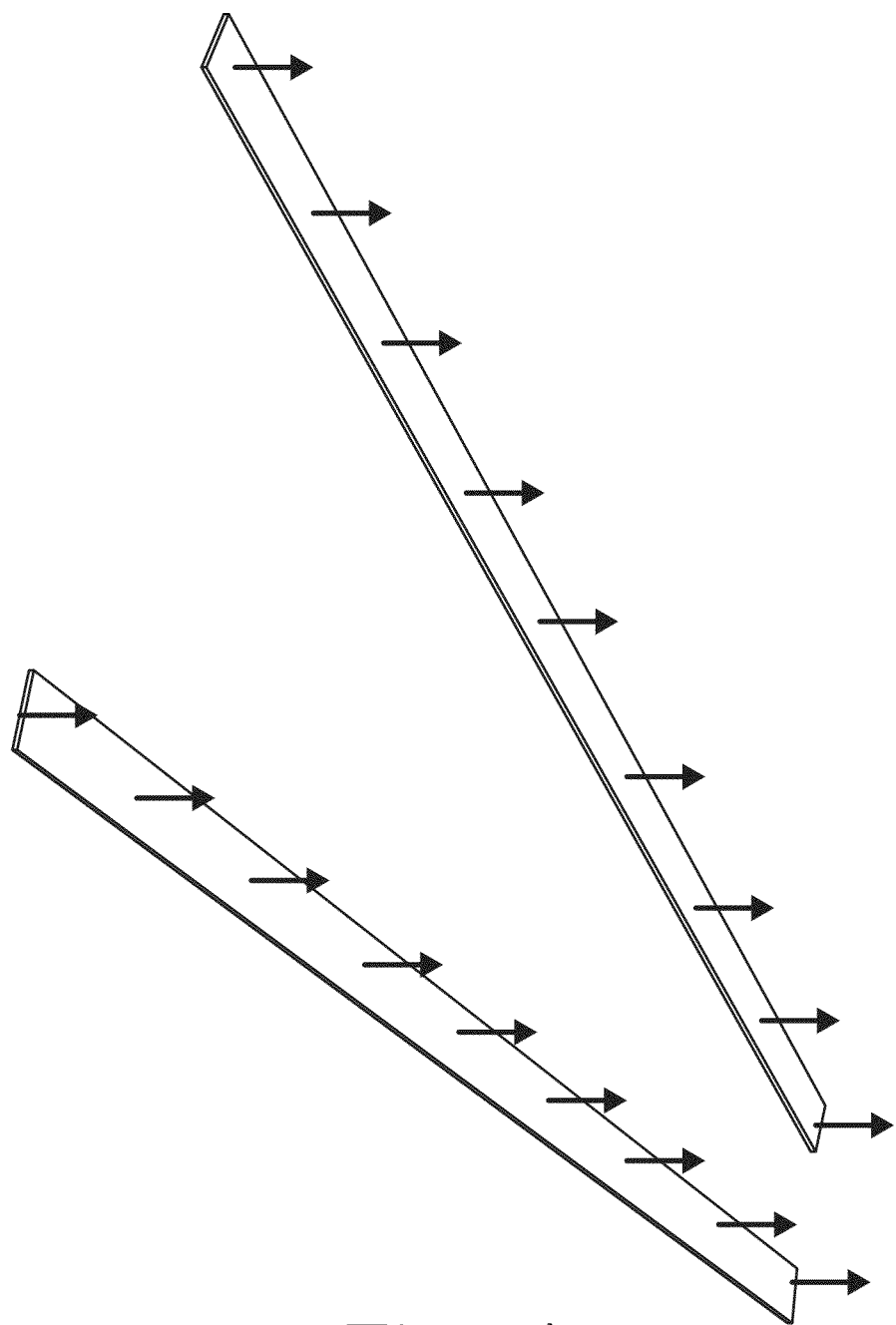
FIGS. 6A and 6B are exemplary diagrams of the flux concentrators and their direction of magnetic moment, according to exemplary embodiments of the present disclosure.
Figure 6B:
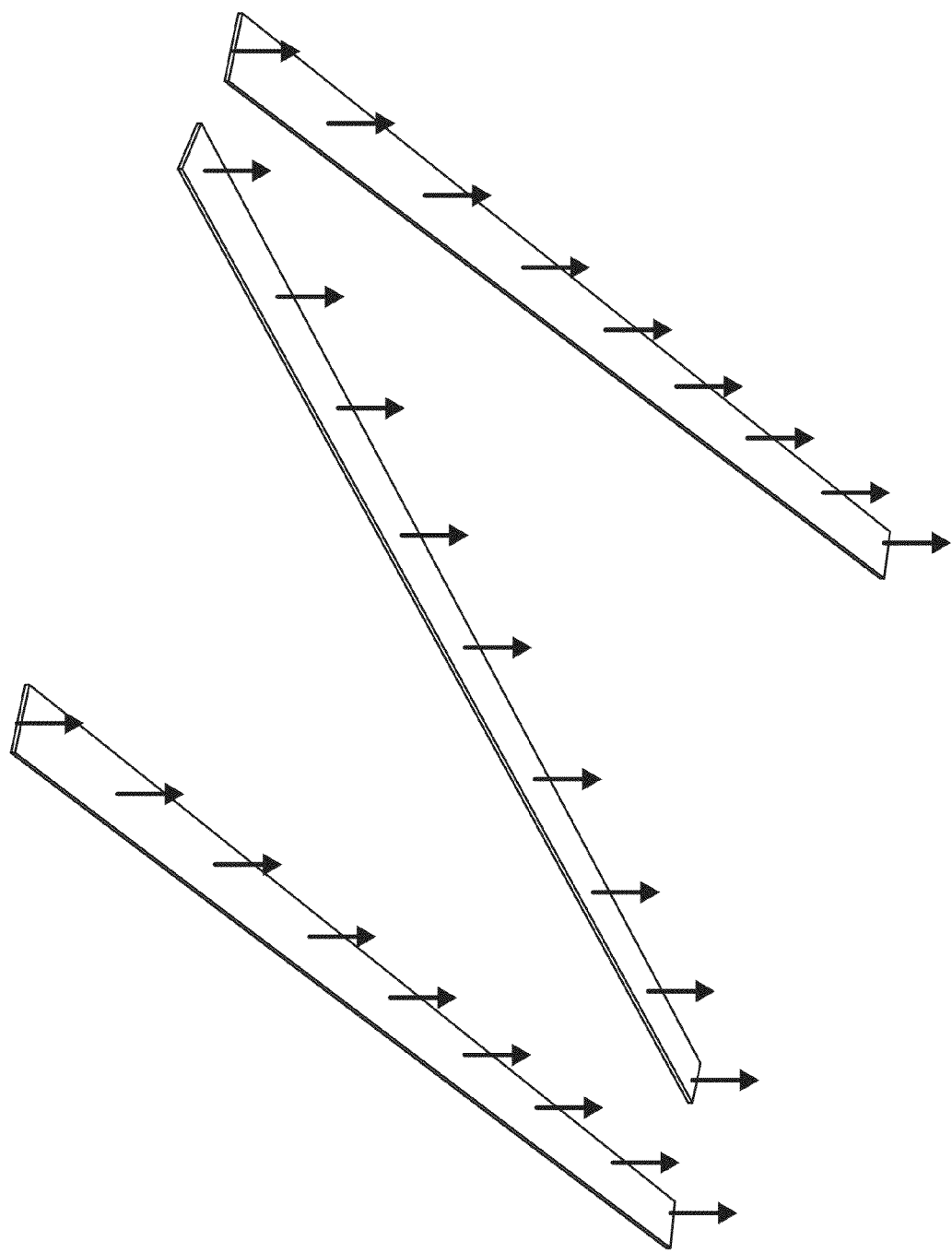
Figure 7:
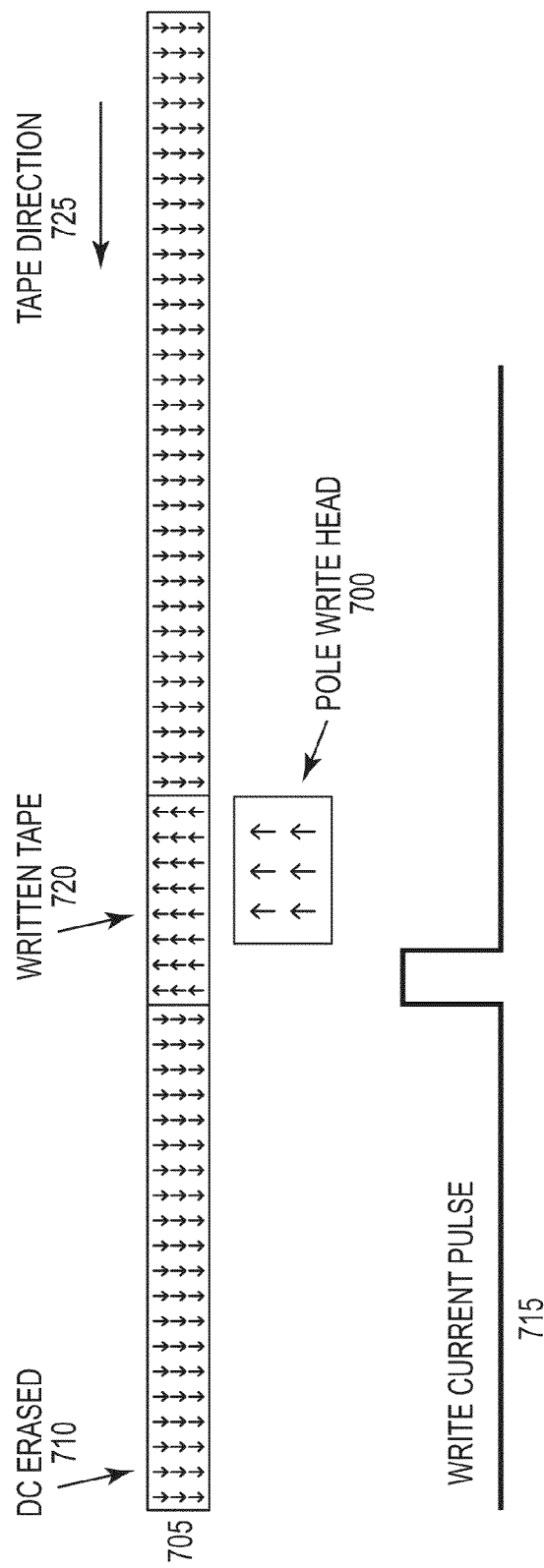
FIG. 7 is an exemplary illustration of a write procedure, according to one exemplary embodiment of the present disclosure.

Exemplary embodiments of the present description describe a new pole head design for writing a timing-based servo pattern on substantially perpendicular media, including perpendicular magnetic media, and a perpendicular pole head for servo writing on such magnetic media. Exemplary embodiments of the present disclosure describe a unique pole servo write head design, e.g., as shown in FIGS. 3A to 6B. FIG. 3A illustrates an exemplary pole head design 305. In certain exemplary embodiments, the servo pattern to be imprinted can be defined by one pole of an electromagnet. This electromagnet can have its magnetic material wrapped by a coil of wire 310 used to create a magnetic field 300 when supplied with current. A non-magnetic material can cover most of the head surface where media contacts the head, e.g., as shown in FIG. 5. When a pulse of current is supplied to the coil, the magnetic field emanating from the pole (either north or south) can be mainly perpendicular to the plane of the tape, e.g., as illustrated with 300. This perpendicular field can be much better suited to the magnetic moment configuration for perpendicular media, such as BaFe media. FIG. 7 illustrates an exemplary write pattern for perpendicular media and an exemplary pole write head, according to an exemplary embodiment of the present disclosure. The resulting magnetization of the media, e.g., as illustrated in FIG. 7, can create clear magnetic boundaries that can be easily detected by a read head.

Figure 1:
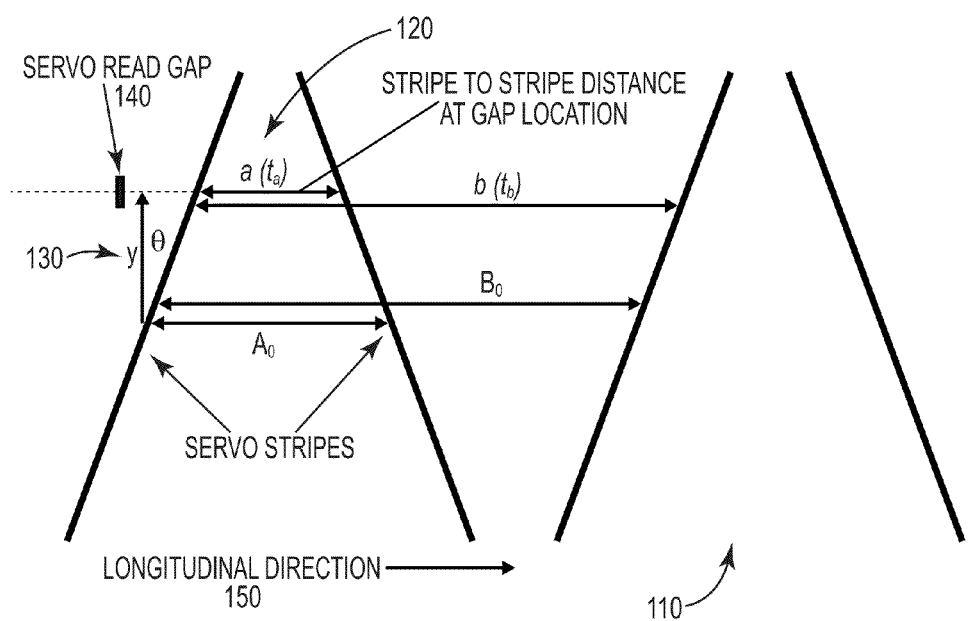
FIG. 1 is a graphical representation of two pattern frames and elements within.
Figure 2A:
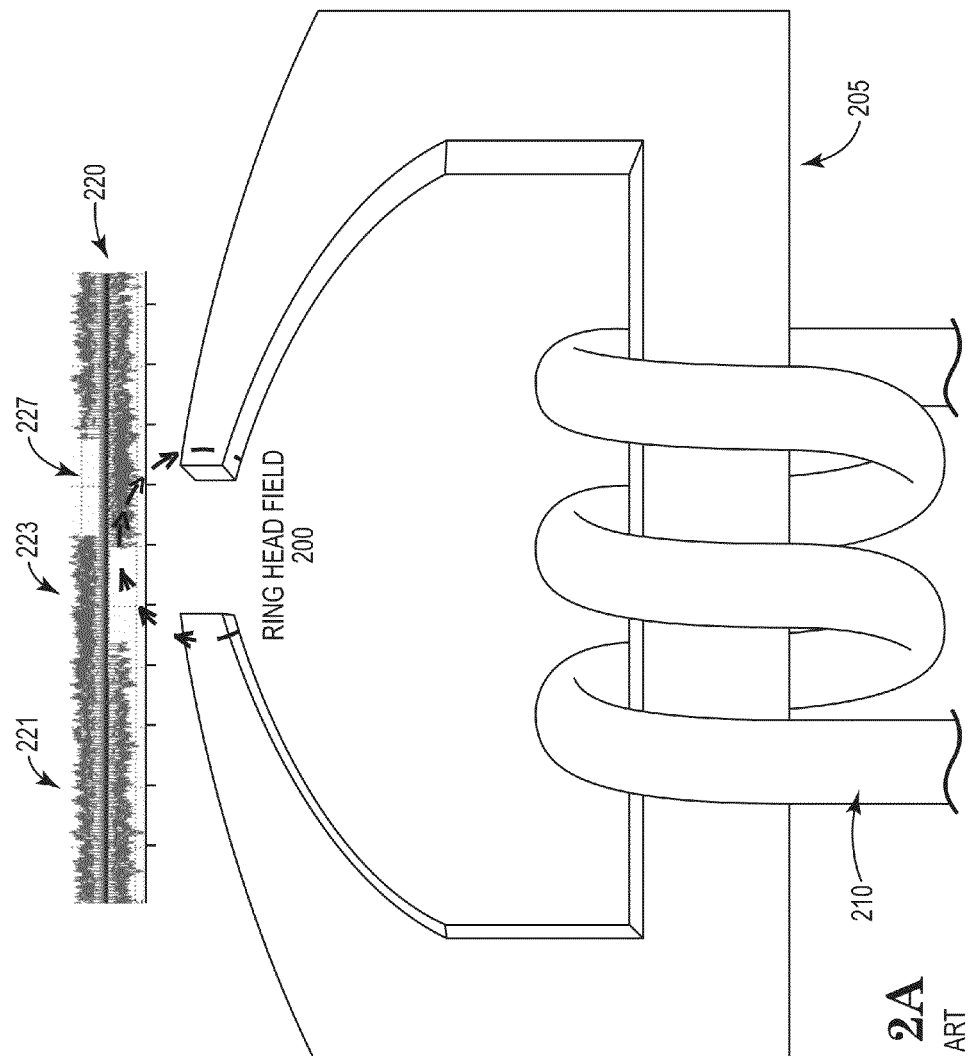
FIG. 2A is a magnetic field ring head for writing on magnetic media, as traditionally used in the art.
Figure 2B:
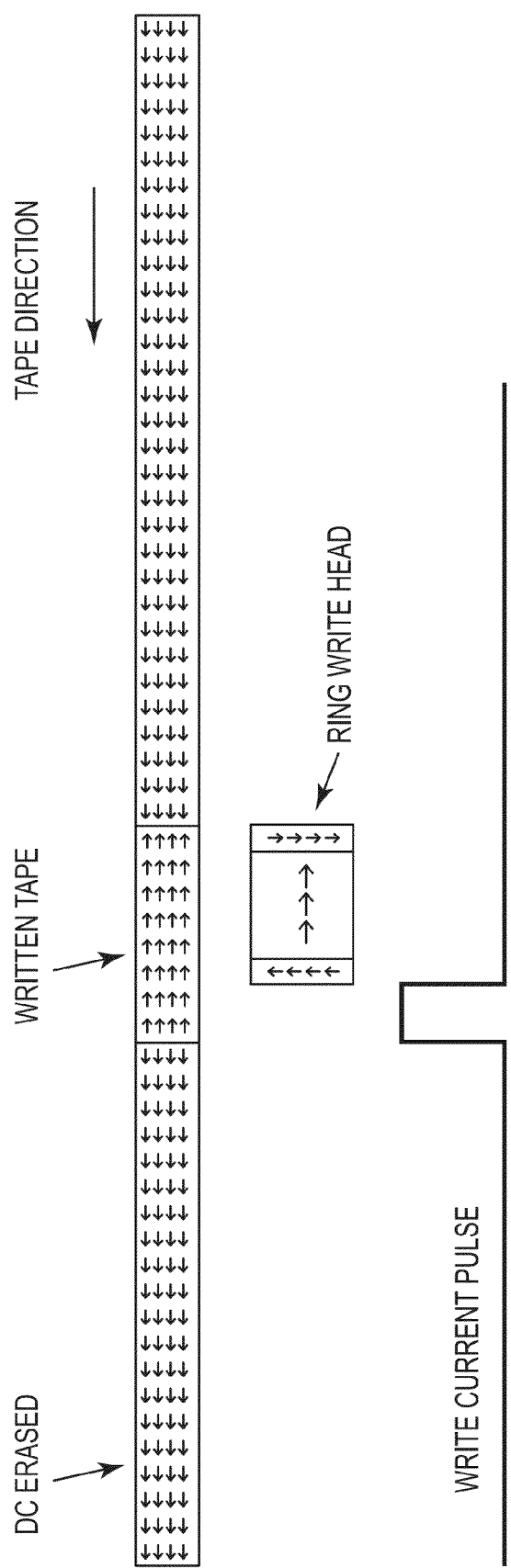
FIG. 2B is an illustration of a process for writing to parallel media, e.g., with the write head of FIG. 2A.
Figure 2C:
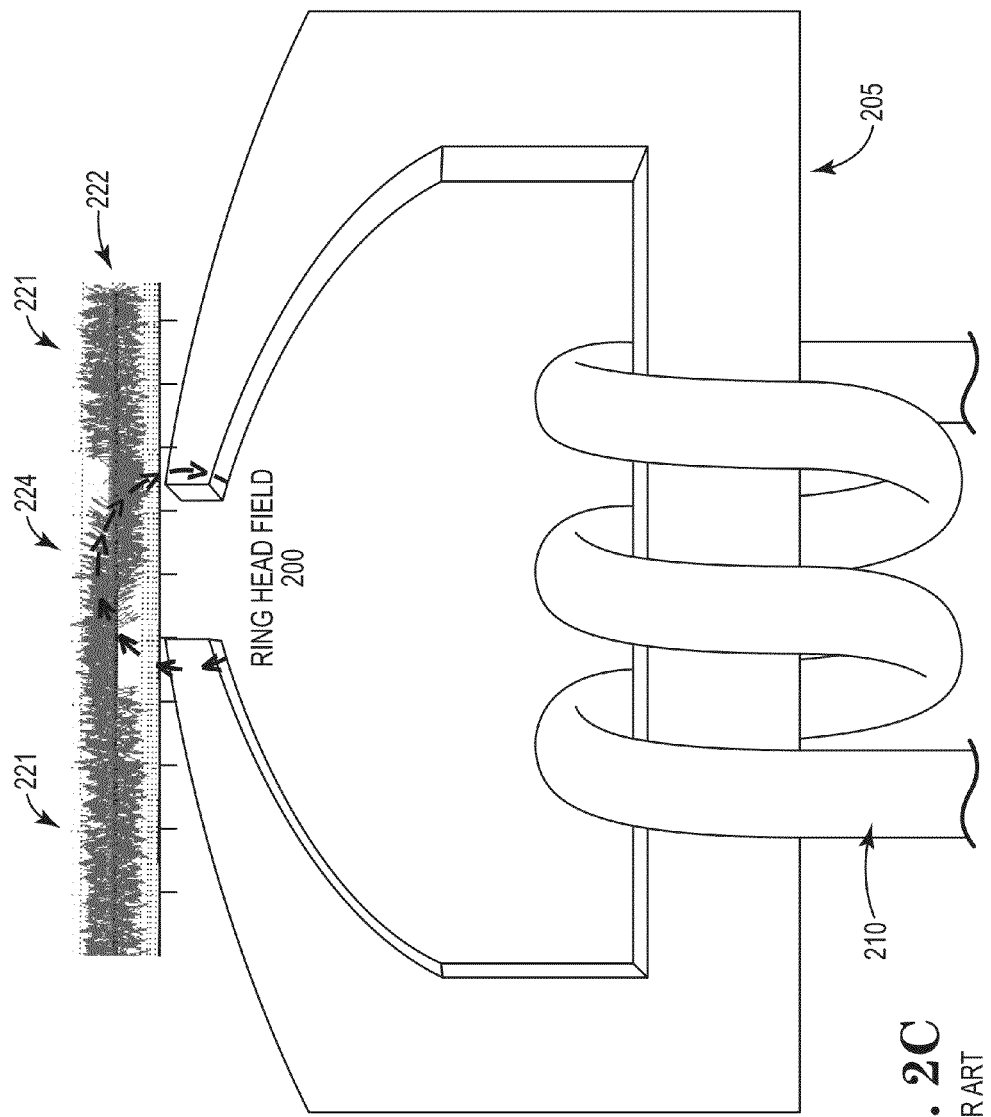
FIG. 2C is an illustration of a field ring head writing to less oriented media.
Figure 2D:
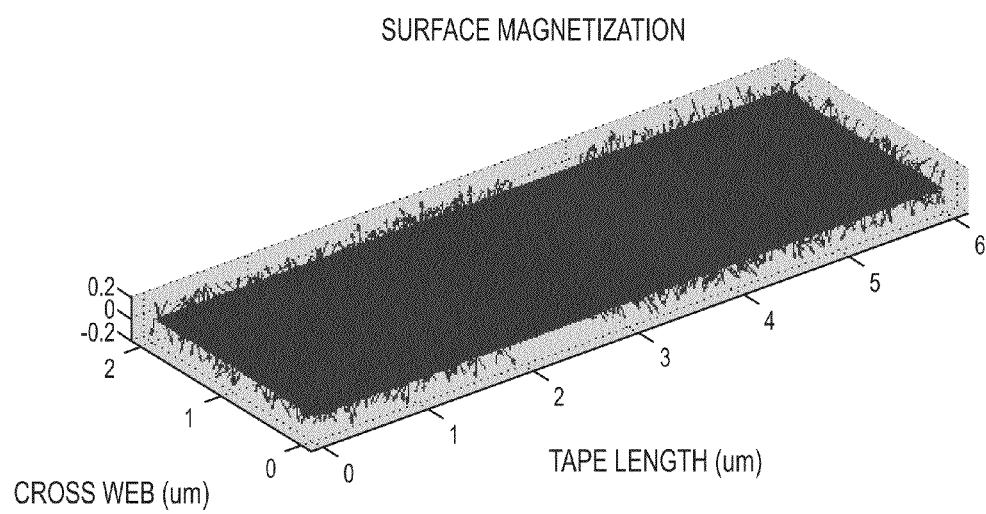
FIG. 2D is a perspective view of a ring head writing to less oriented media.
Figure 2E:
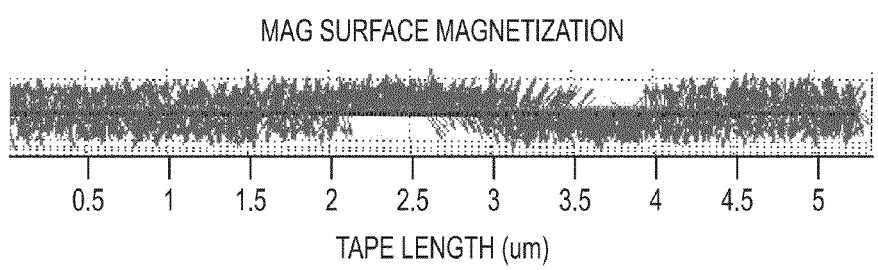
FIG. 2E is a cross-sectional view of a ring head writing to less oriented media.
Figure 2F:
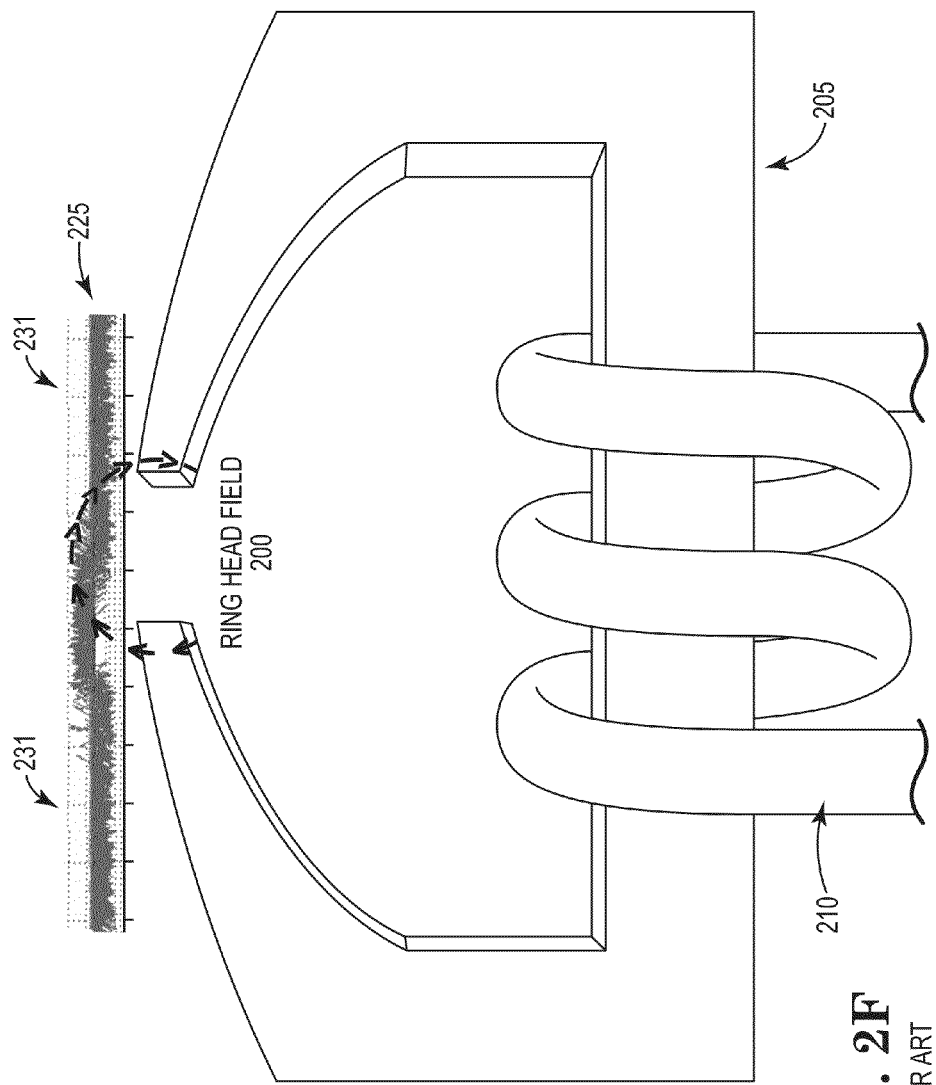
FIG. 2F is an illustration of a field ring head writing to DC erased media.
Figure 3B:
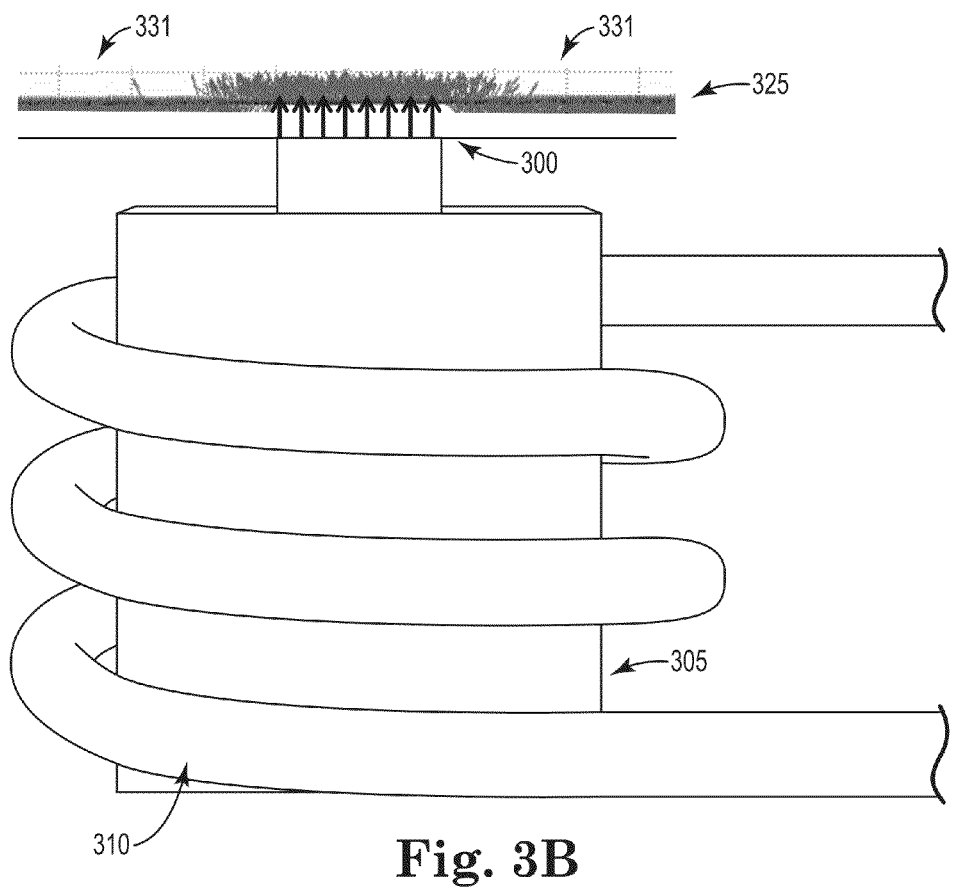
FIG. 3B is an exemplary pole write head and less oriented media, according to another exemplary embodiment of the present disclosure.

Returning to FIG. 3A, oriented media 322 is illustrated in cross-section over exemplary (e.g., perpendicular) pole head 305. Exemplary media 322 is shown AC erased, e.g., in areas 321. Exemplary embodiments of pole head 305 can generate a perpendicular magnetic field 300 and generate a write area 323. Write area 323 can be contrasted with areas 223 and 227 of FIG. 2A which includes an area 227 in a second direction. As illustrated, exemplary head 305 can generate a field 300 to write in a single direction (e.g., when current is applied through coil 310 in a single direction). FIG. 3B illustrates exemplary pole head 305 with less oriented media 322 and DC erased areas 331.

FIGS. 3C to 3F illustrate DC erased less oriented media. FIG. 3C illustrates a write zone of a previously discussed ring head design, and FIG. 3D illustrates a cross-sectional view. FIG. 3E illustrates a write zone of an exemplary pole head design, and FIG. 3F illustrates a cross sectional view. FIGS. 3G to 3J illustrate AC erased oriented media. FIG. 3G illustrates a write zone of a previously discussed ring head design, and FIG. 3H illustrates a cross-sectional view. FIG. 3I illustrates a write zone of an exemplary pole head design, and FIG. 3J illustrates a cross sectional view.

Figure 4A:
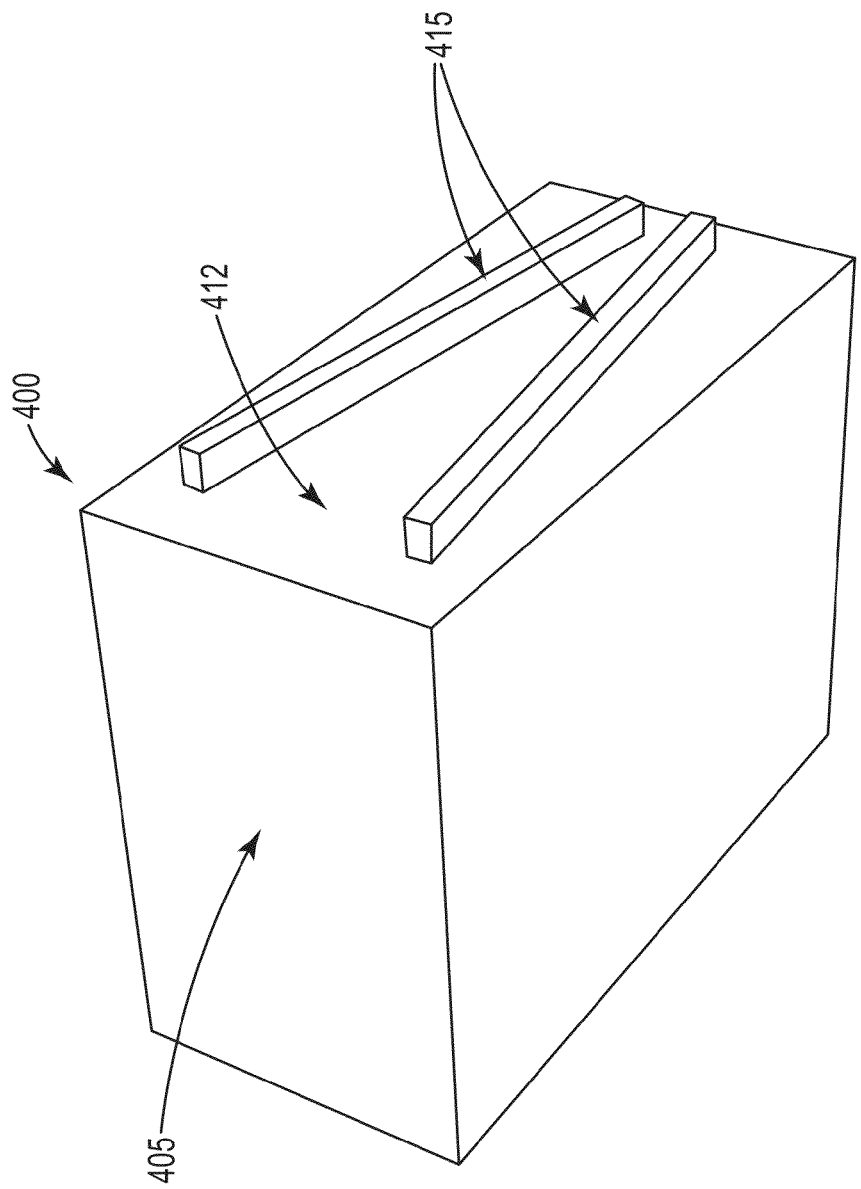
FIG. 4A is an exemplary pole write head, according to one exemplary embodiment of the present disclosure.

FIG. 4A, which illustrates an exemplary embodiment of the present disclosure, shows an exemplary single pole (e.g., perpendicular) head design. Being a single pole, as compared to the dual pole head design in FIG. 2A, the generated magnetic field can substantially be confined to a direction perpendicular to a surface of the head 400. The exemplary head design can include a primary write head 405, which can include material configured to generate a magnetic field, e.g., through magnetic properties of the material, an applied electric current, or a combination of material and current. The generated magnetic field can emanate substantially perpendicularly from a surface 412 of primary head 405.

On this surface 412, a plurality of flux concentrators can be disposed, such as the protruding bars 415. These concentrators 415 can concentrate or focus the perpendicular magnetic field in a shape substantially similar to the concentrators. Thus, when applied to a magnetic medium, a shape substantially similar to the concentrators can be written to the magnetic medium. The concentrator shape can be formed for writing a servo pattern frame in any suitable and desired configuration. For example, the shape can include a "V" shape as illustrated, or any number of other shapes used for servo timing patterns, such as an "/V/" or "//\" or "\V\" shape, also referred to as an "N" shape, as described in U.S. Pat. Nos. 6,842,305 and 6,542,325, the entire contents of both of which are herein incorporated by reference. FIGS. 6A and 6B illustrate exemplary embodiments of a "V" shaped and "N" shaped flux concentrator pattern respectively.

As illustrated in FIG. 4B, the magnetic field can be generated in whole or in part by an electrical current. To facilitate this, head 400 can be wrapped in a wire coil 410, or any other arrangement configured to facilitate or generate a magnetic field via an electric current. When current is applied to the exemplary coil 410, a magnetic field can be formed in a first direction 420 perpendicular to the surface of 400 having the concentrators. When the current is applied in the opposite direction, the magnetic field can be formed in a second direction 425 that is substantially opposite to the first direction 420.

FIG. 5 illustrates an exemplary cover for exemplary head 400. The cover 510 can be constructed from any number of materials, and preferably is a non-magnetic material, such as Aluminum Titanium Carbide (AlTiC), Barium Titanate (BaTiO), Calcium Titanate (CaTiO), Silicon Nitride (SiN), Aluminum Oxide (Al2O3), or any number of other suitable materials. A non-magnetic material can be any material that approximately does not add to nearby magnetic fields (e.g., those emanating from head 400). Alternatively, the exemplary cover 510 can be made from a magnetically insulated or magnetic shielding material, e.g., a material that can block at least part of the magnetic field emanating from the primary write head (e.g., 405), such as a high permeability (e.g., iron or nickel-iron) alloy or superconductor. Since concentrators 415 remain uncovered by cover 510, the concentrated magnetic field emanating from concentrators 415 can remain free from the insulating or shielding effects of exemplary cover 510, even if formed from a magnetically insulated or shielding material.

Exemplary cover 510 can include a first surface 520, and optionally, one or more side surfaces 525 (e.g., two sides surfaces, as shown, and/or three or four side surfaces). The first surface 520 can define cutouts, holes, or voids, 515, which can be dimensioned and configured to be adjacent to and/or to receive concentrators 415. Concentrators 415 can protrude from a surface of primary head 405 a certain distance, and the first surface 520 of the cover can include a thickness approximately or exactly equal to that protruding distance. In this way, the cover surface 520 can rest on a surface of primary head 405 (e.g., surface 412) while being flush with the outer surface of concentrators 415.

Regardless of the protruding distance of concentrators 415 and/or the thickness of cover surface 520, the cover surface 520 is preferably flush with the outer surfaces of concentrators 415. The exemplary head 400 can be used to imprint patterns on magnetic media, such as BaFe. To do this, the media can be run over the head, either in contact with or close to the head. For example, a tape drive can include a reel-to-reel tape of magnetic film, e.g., made from BaFe and other materials. This tape can be run over exemplary head 400 while electrical pulses applied to the head 400 cause an intermittent magnetic field to imprint a pattern on the magnetic media. It may be appreciated that magnetic media in contact with head 400 and moving over head 400 may snag, tear, or otherwise damage the tape and/or head by the protruding concentrators 415. The exemplary cover 520 can allow for a smooth, flush surface for the magnetic media to travel over concentrators 415, preserving both the media and head 400.

Exemplary embodiments of the present disclosure can also include a method of writing a servo pattern on perpendicular media. For example, FIG. 7 illustrates a graphical representation of a write procedure. Most of the exemplary media (e.g., tape 705) is in an erased state 710, illustrated by down arrows. A controller may apply a write current pulse 715, which may generate a magnetic field in an exemplary write head, by running a current through a coil around that exemplary write head. This can cause the exemplary (e.g. perpendicular pole) write head 700 to generate that magnetic field and create a written tape portion 720 as the tape 705 travels over the head (e.g., in direction 725).

Figure 8:
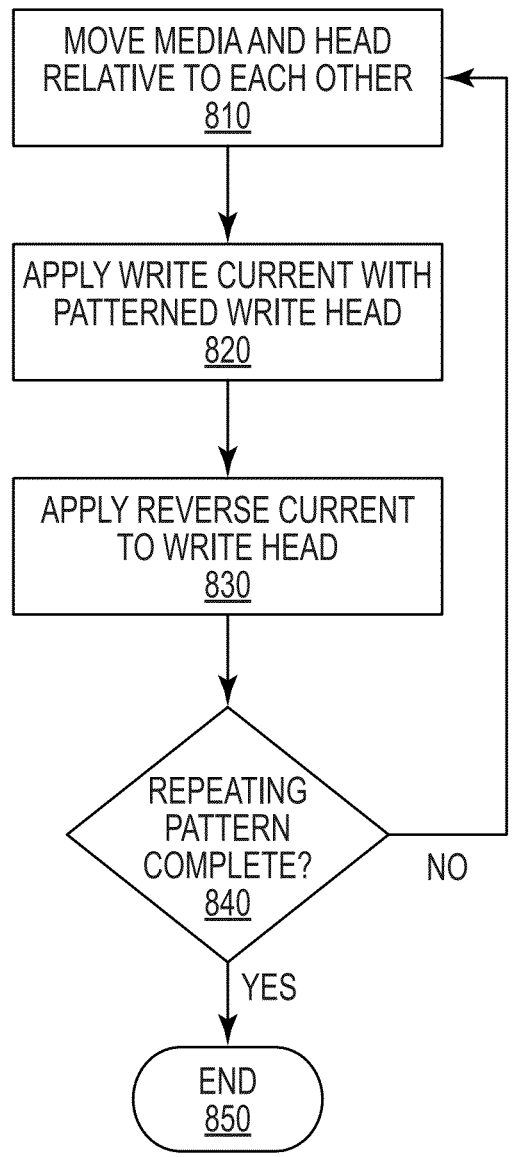
FIG. 8 is a flow diagram of an exemplary method, according to one exemplary embodiment of the present disclosure.

FIG. 8 illustrates another exemplary embodiment of the present disclosure, including a flow diagram of an exemplary write method. First, at 810, the magnetic media and write head are moved relative to each other at 810. This can include moving the media (e.g., turning tape reels, spinning disk platters, etc.), include moving the head, or both (e.g., moving the head along a disk radius as the disk spins). Next, at 820, the exemplary method can apply a write current (e.g., to a coil that generates a magnetic field from the write head) at appropriate times. Optionally, at 830 in dashed border, the exemplary method can apply an opposite current during non-write times. This opposite current can create cleaner boundaries between the written area and the unwritten area. This exemplary "non-write" opposite current can be the same or different as current applied during erase periods. Certain exemplary embodiments can simply apply a write current at 820, and apply no current or less current when the head does not need to be writing to the media (e.g., when certain exemplary embodiments do not include step 830). However, this may create a small amount of noise at the boundaries as the media continues to move and the magnetic field dissipates over a small interval of time.

This may be fully sufficient for certain implementations, but for other implementations an exemplary method can force the field in the opposite direction by driving the current in the opposite direction, and thereby force the un-written areas to remain in an erased state. For example, certain exemplary embodiments can include current in a first direction for writing, no current for non-write periods, and current in an opposite direction for erasing. Other exemplary embodiments can include current in the first direction for writing, and current in an opposite direction for non-write periods and also erase periods. Such reverse current methods can also be used in other implementations to write patterns to both sides of the magnetic media, which may be mirror images of each other, offset mirrors, or totally different patterns.

These exemplary steps can be repeated to construct a repeating pattern on the magnetic media. For example, at 840 the exemplary method can check to see if the pattern writing is complete and return to 810 if it is not. If it is complete, the exemplary method can end at 850. While each exemplary step has been illustrated in a discrete process box, certain exemplary steps may be continuous. For example, step 810 can include a continuous reeling of a tape media over a write head, which can be repeatedly and intermittently activated at step 820 as the pattern indicates.

Figure 9:
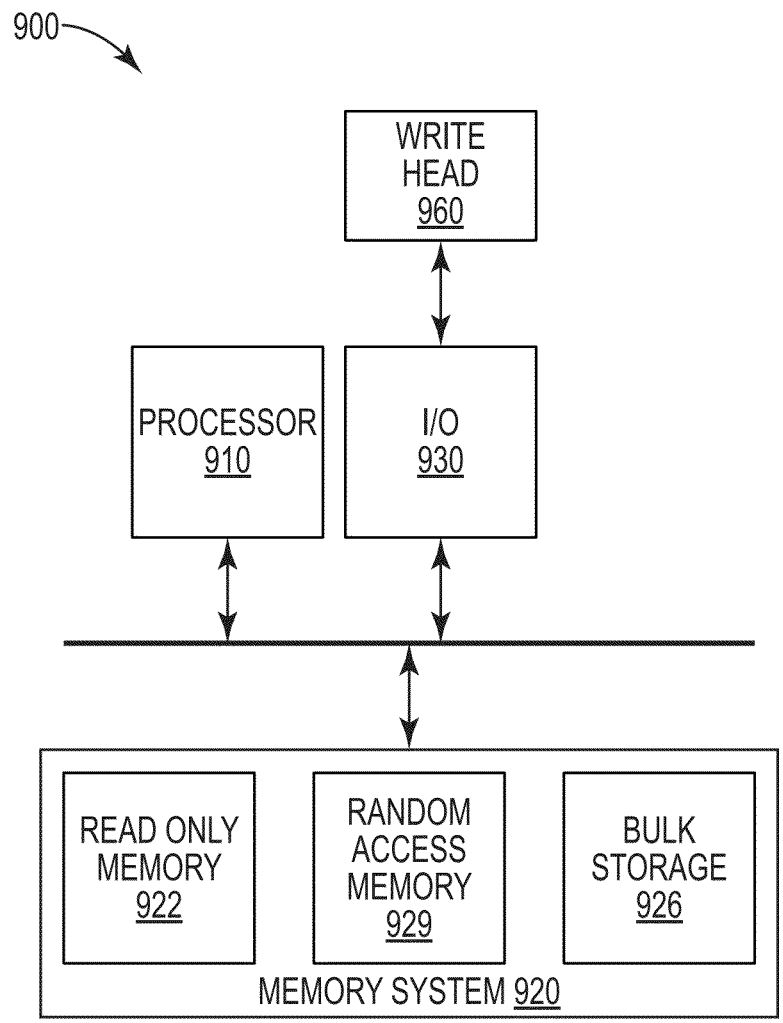
FIG. 9 is an exemplary control system, according to one exemplary embodiment of the present disclosure.

FIG. 9 illustrates an exemplary system 900 that can include a controller for writing an exemplary timing pattern. System 900 can be configured to execute exemplary procedures, according to other exemplary embodiments of the present invention. The exemplary system 900 can include a processor or controller 910, an input/output port 930, which can include the write head 960 and/or a current application device connected to a coil of write head 960, and various memories 920, including, e.g., read only memory 922, random access memory 929, and bulk storage memory 926 (e.g., a disk drive, network drive, database, etc.), which can include control logic for the timing pattern to be written via the write head 960. Different exemplary embodiments can include more or fewer components.

Figure 10A:
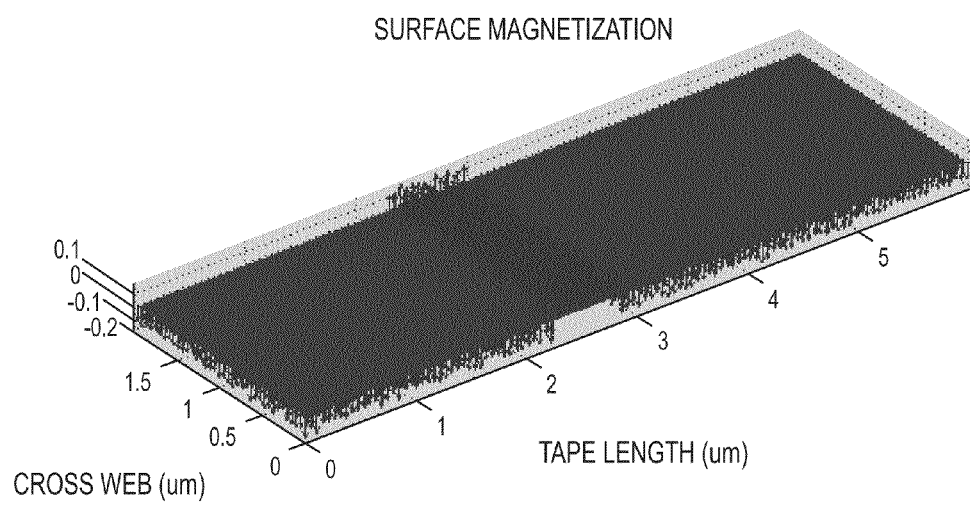
FIGS. 10A and 10B are a perspective view and a cross-sectional view of a narrow band written with an exemplary pole head.
Figure 10B:
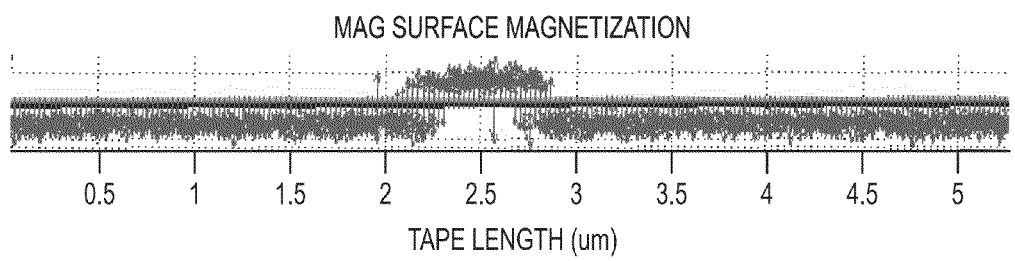
Figure 11:
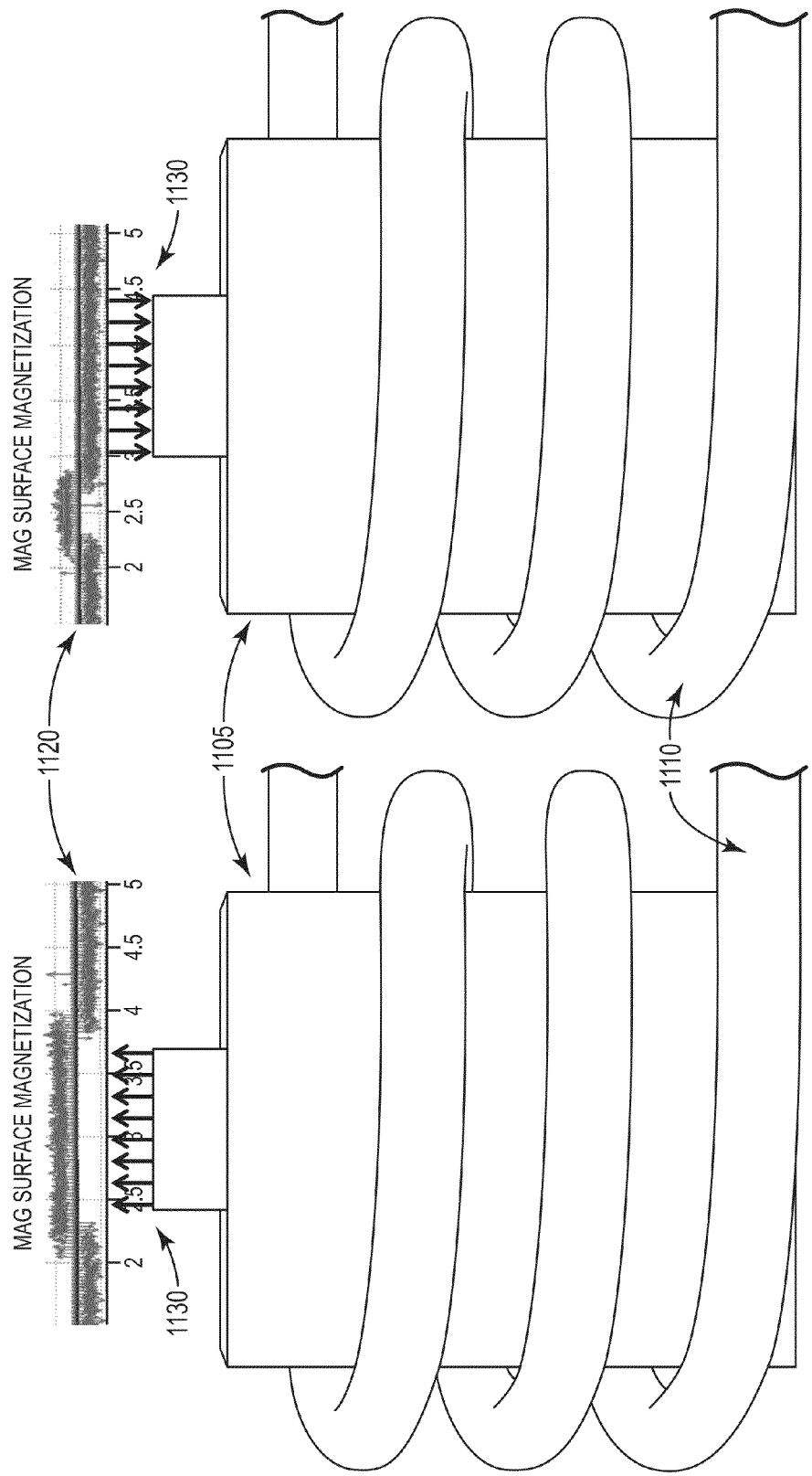
FIG. 11 is an exemplary illustration of an exemplary pole head, shown twice in an illustrated exemplary two step write process, according to one exemplary embodiment of the present disclosure.

Certain exemplary embodiments can be used to write a very narrow pulse, e.g., even narrower than the pole width. For example, FIGS. 10A and 10B illustrate DC erased oriented media with a written pulse narrower than an exemplary pole width. By writing in a first direction, and then switching directions to write in the opposite direction, e.g., the DC erase direction, a narrow pulse width can be created, which can be narrower than a traditional ring head design is capable of creating. FIG. 11 illustrates an example of this in two stages. First, head 1105 can apply a first magnetic field 1130. In the first exemplary stage, current can be driven through coil 1110 to create a write pulse 1130 to media 1120 of approximately the same width as the pole head. In the second exemplary stage, after media 1120 has traversed less than the full width, current can be driven through coil 1110 in the opposite direction to create field 1130.

Figure 12A:
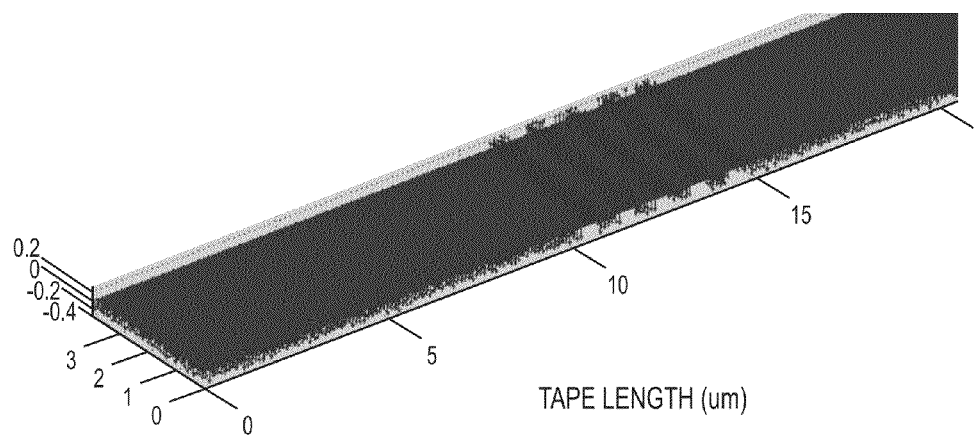
FIG. 12A is an illustration of an exemplary servo burst of narrow stripes, according to one exemplary embodiment of the present disclosure.
Figure 12B:
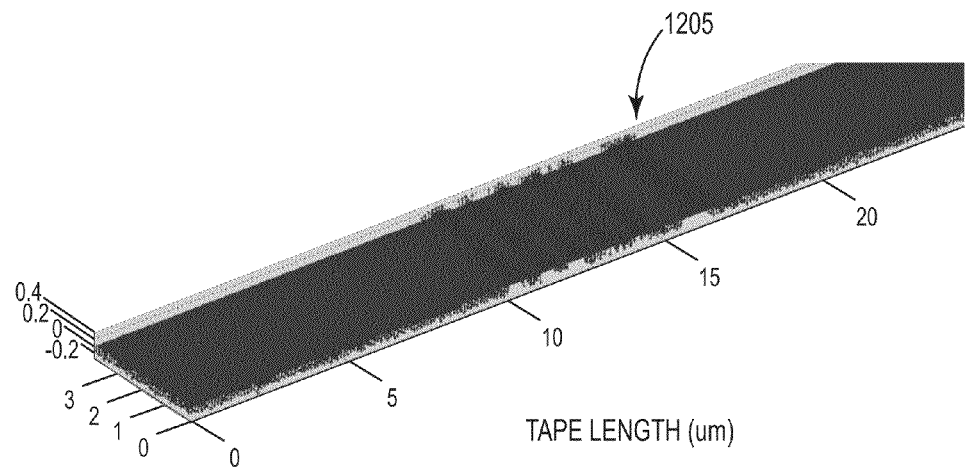
FIG. 12B is a contrasting illustration of what a traditional ring head could produce if attempting to create a servo burst of narrow stripes.

One exemplary benefit of exemplary pole head designs is illustrated in FIGS. 12A to 12B. FIG. 12A illustrates a series of short pulse writes on DC erased media. FIG. 12B illustrates media written with a traditional ring head. As illustrated, the exemplary transitions in FIG. 12A are clearer than the exemplary transitions illustrated in FIG. 12B. Further, a traditional ring head leaves an undesirable thick write pattern 1205 at the end of a series of stripes. This series of stripes can include a servo burst or group of servo bursts. Media written with a traditional ring head can be characterized by a long transition at the last stripe of a servo burst, while exemplary pole head designs can include transition lengths that are all approximately equal, e.g., all within 75% to 125% of the average transition length of all the pulses within a servo burst or group of servo bursts.

The foregoing merely illustrates the principles of the disclosure. Various modifications and alterations to the described embodiments will be apparent to those skilled in the art in view of the teachings herein. For example, while write heads have been generally described for permanent writing of servo timing patterns, any number of other permanent or temporary uses would be made, including but not limited to erasable magnetic writing or non-servo writing (e.g., user data recording). It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. It should be understood that the exemplary procedures described herein can be stored on any computer accessible medium, including magnetic tape or other magnetic media, a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and numbered paragraphs thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

In the foregoing description, various embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

We claim:

1. A perpendicular write head, comprising:
   a primary write head configured to generate a magnetic field approximately perpendicular to a surface of the primary write head;
   a plurality of flux concentrators disposed on and protruding from the surface of the primary write head, the flux concentrators configured to concentrate the magnetic field in a servo pattern; and
   a nonmagnetic cover material disposed on the surface of the primary write head in contact with a magnetic medium, the nonmagnetic cover material defining a plurality of holes through which the flux concentrators are positioned such that an outer surface of each flux concentrator is approximately flush with an outer surface of the nonmagnetic cover material;
   wherein the magnetic field is concentrated in the magnetic medium by the flux concentrators such that the concentrated magnetic field is greater than 110% of a coercivity of the magnetic medium, and wherein an unconcentrated magnetic field generated by the primary write head is less than 90% of the coercivity of the magnetic medium, absent the flux concentrators.

2. The perpendicular write head of claim 1, wherein the plurality of flux concentrators includes at least two stripes disposed at an angle with respect to each other.

3. The perpendicular write head of claim 1, wherein the plurality of flux concentrators is substantially disposed in one of a "\/" shape, a "/\/" shape, a "\\/" shape, or a "// \" shape.

4. The perpendicular write head of claim 1, wherein the primary write head does not generate a substantial magnetic field approximately parallel to the surface of the primary write head at the surface in contact with the magnetic medium.

5. The perpendicular write head of claim 1, wherein the primary write head is configured to generate the magnetic field in a first direction approximately perpendicular to and directed away from the surface of the primary write head.

6. The perpendicular write head of claim 5, wherein the primary write head is further configured to generate an opposite magnetic field approximately perpendicular to the surface of the primary write head and in a second direction opposite the first direction.

7. The perpendicular write head of claim 6, wherein the primary write head is further configured to generate magnetic fields alternating between the first direction and the second direction.

8. The perpendicular write head of claim 1, further comprising a coil of wire wrapped around the primary write head, wherein the primary write head is configured to generate the magnetic field when a pulse of current is supplied to the coil.

9. The perpendicular write head of claim 1, wherein the nonmagnetic cover material is selected from Aluminum Titanium Carbide (AlTiC), Barium Titanate (BaTiO), Calcium Titanate (CaTiO), Silicon Nitride (SiN) and Aluminum Oxide (Al2O3).

10. A perpendicular write head, comprising:
    a primary write head configured to generate a magnetic field approximately perpendicular to a surface of the primary write head;
    a plurality of flux concentrators disposed on and protruding from the surface of the primary write head, the flux concentrators configured to concentrate the magnetic field in a servo pattern; and
    a nonmagnetic cover material disposed on the surface of the primary write head in contact with a magnetic medium, the nonmagnetic cover material defining a plurality of holes through which the flux concentrators are positioned such that an outer surface of each flux concentrator is approximately flush with an outer surface of the nonmagnetic cover material;
    wherein the magnetic field is concentrated in the magnetic medium by the flux concentrators such that the concentrated magnetic field is greater than 110% of a coercivity of the magnetic medium, and wherein an unconcentrated magnetic field generated by the primary write head is less than 90% of the coercivity of the magnetic medium, absent the flux concentrators; and
    wherein the magnetic medium comprises a servo pattern having a first set of burst areas with magnetization oriented in a first direction perpendicular to the magnetic medium and a second set of burst areas with magnetization oriented in a second direction perpendicular to the magnetic medium, the second direction opposite the first direction, and wherein each of the first set of burst areas has a length of 75% to 125% of an average length of the first set of burst areas.

11. The perpendicular write head of claim 10, wherein the pattern is a servo timing pattern.

12. The perpendicular write head of claim 10, wherein the pattern includes a plurality of servo stripes angled with respect to each other.

13. The perpendicular write head of claim 10, wherein the pattern is disposed in substantially a "\/" shape.

14. The perpendicular write head of claim 10, wherein the pattern is substantially disposed in one of a "/\/" shape, a "\\/" shape, or a "// \" shape.

15. A method of writing a magnetic servo pattern, the method comprising:
    moving a magnetic medium relative to a perpendicular write head, wherein the perpendicular write head includes:
    a primary write head configured to generate a magnetic field approximately perpendicular to a surface of the primary write head;
    a plurality of flux concentrators disposed on and protruding from the surface of the primary write head, the flux concentrators configured to concentrate the magnetic field in a servo pattern; and
    a nonmagnetic cover material disposed on the surface of the primary write head in contact with a magnetic medium, the nonmagnetic cover material defining a plurality of holes through which the flux concentrators are positioned such that an outer surface of each flux concentrator is approximately flush with an outer surface of the nonmagnetic cover material; and generating the magnetic field during a write time period to create the magnetic field in the servo pattern;

wherein the magnetic field is concentrated in the magnetic medium by the flux concentrators such that the concentrated magnetic field is greater than 110% of a coercivity of the magnetic medium, and wherein an unconcentrated magnetic field generated by the primary write head is less than 90% of the coercivity of the magnetic medium, absent the flux concentrator.

16. The method of claim 15, wherein generating the magnetic field includes applying an electric current to a coil disposed about the primary write head in a first direction.

17. The method of claim 16, further comprising: generating an opposite magnetic field with the primary write head during a non-write time period that does not include the write time period.

18. The method of claim 17, wherein generating the opposite magnetic field includes applying the electric current to the primary write head in a second direction opposite the first direction.

19. The method of claim 15, wherein the servo pattern includes a plurality of servo strips, each with a length of 75% to 125% of an average length of the plurality of servo stripes.

* * * * *